(12) United States Patent
Li (10) Patent No.: US 11,874,786 B2
(45) Date of Patent: Jan. 16, 2024

(54) AUTOMATIC SWITCHING SYSTEM AND METHOD FOR FRONT END PROCESSOR

(71) Applicant: BYD COMPANY LIMITED, Guangdong (CN)

(72) Inventor: Jianguo Li, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 317 days.

(21) Appl. No.: 17/428,146

(22) PCT Filed: Feb. 14, 2020

(86) PCT No.: PCT/CN2020/075373
§ 371 (c)(1),
(2) Date: Aug. 3, 2021

(87) PCT Pub. No.: WO2020/156584
PCT Pub. Date: Aug. 6, 2020

(65) Prior Publication Data
US 2022/0129402 A1    Apr. 28, 2022

(30) Foreign Application Priority Data
Feb. 3, 2019 (CN) .......................... 201910108710.9

(51) Int. Cl.
*G06F 11/20* (2006.01)
*G06F 13/40* (2006.01)
(Continued)

(52) U.S. Cl.
CPC ...... *G06F 13/4022* (2013.01); *G06F 11/2033* (2013.01); *G06F 11/221* (2013.01); *G06F 11/263* (2013.01)

(58) Field of Classification Search
CPC .. G06F 11/2033; G06F 11/221; G06F 11/263; G06F 13/4022
(Continued)

(56) References Cited

U.S. PATENT DOCUMENTS 5,021,949 A    6/1991  Morten et al.
6,594,776 B1 *  7/2003  Karighattam ......... H04L 49/557
                                                    370/386
(Continued)

FOREIGN PATENT DOCUMENTS

CN    101813937 A    8/2010
CN    101916096 A    12/2010

OTHER PUBLICATIONS

International Search Report of PCT/CN2020/075373 dated May 11, 2020 (2 pages).
(Continued)

*Primary Examiner* — Chae M Ko
(74) *Attorney, Agent, or Firm* — Calfee, Halter & Griswold LLP (57) ABSTRACT

This application discloses an automatic switching system and method for a front end processor (FEP). The system includes: at least one external device and a FEP assembly. The FEP assembly is connected to the at least one external device. The FEP assembly provides services upward by using a primary memory, a primary TO manager, a secondary memory, and a secondary TO manager, and is connected downward to the at least one external device by using at least one primary driver and at least one secondary driver. The FEP assembly is configured to use the at least one secondary driver as a new primary driver when there is a fault in a communication link between the at least one primary driver and the at least one external device, to transmit a control (Continued)

- S1 Provide services upward by using the primary memory, the primary IO manager, the secondary memory, and the secondary IO manager

- S2 Connect downward to the at least one external device by the at least one primary driver and the at least one secondary driver

- S3 Use the at least one secondary driver as a new primary driver when there is a fault in a communication link between the at least one primary driver and the at least one external device, to transmit a control instruction to the at least one external device, and acquire data from the at least one external instruction to the at least one external device and acquire data from the at least one external device.

20 Claims, 6 Drawing Sheets

(51) Int. Cl.
*G06F 11/22* (2006.01)
*G06F 11/263* (2006.01)

(58) Field of Classification Search
USPC .......................................... 714/4.11
See application file for complete search history.

(56) References Cited

U.S. PATENT DOCUMENTS

| | | | |
|---|---|---|---|
| 7,257,730 B2 * | 8/2007 | Spry | G06F 11/2007 |
| | | | 714/4.1 |
| 9,537,711 B2 * | 1/2017 | Nakash | H04L 41/0668 |
| 2002/0116564 A1 | 8/2002 | Paul et al. | |
| 2006/0020854 A1 * | 1/2006 | Cardona | G06F 11/2005 |
| | | | 714/13 |
| 2012/0089864 A1 * | 4/2012 | Tanaka | G06F 11/201 |
| | | | 710/22 |
| 2012/0266015 A1 * | 10/2012 | Taylor | H04L 45/76 |
| | | | 714/E11.073 |

OTHER PUBLICATIONS

Zhang Daqian et al., "Application and Optimization of Front End Processors in Integrated Supervisory Control System", Urban Rapid Rail Transit, 2011, pp. 60-63 (English Abstract).

* cited by examiner

AUTOMATIC SWITCHING SYSTEM AND METHOD FOR FRONT END PROCESSOR

CROSS-REFERENCE TO RELATED APPLICATIONS

This application is a National Stage of PCT Application No. PCT/CN2020/075373, filed on Feb. 14, 2020, which claims priority to Chinese Patent Application No. 201910108710.9 filed on Feb. 3, 2019, which are incorporated herein by reference in their entireties.

FIELD

This application relates to the field of communication technologies, and in particular, to an automatic switching system and method for a front end processor (FEP).

BACKGROUND

A FEP usually refers to a computer that belongs to a relatively large computer system, is located at a front end of a host of the system, and acts as an intermediary. The FEP is configured to manage interfaces between an integrated supervisory control system (ISCS) and integrated and interconnected systems. The FEP is capable of converting various hardware interfaces and software protocols, and can also effectively isolate data of the ISCS from data of the integrated and interconnected systems.

In the related art, a redundancy configuration is usually adopted for FEPs. Generally, two FEPs, that is, a FEP configured to acquire and publish data and a backup FEP, are configured. When an abnormality occurs in an operating status of the FEP configured to acquire and publish data, redundancy switching is performed.

However, redundancy switching of the FEP in the related art is excessively simple. When an abnormality occurs in an operating status of the host, only simple data redundancy is performed, and there is no real-time effective prompt starting solution for the ISCS. Consequently, data integrity and communication reliability cannot be effectively ensured.

SUMMARY

This application is intended to resolve one of the technical problems in the related art at least to some extent.

In view of this, a first objective of this application is to provide an automatic switching system for a FEP. The system can effectively avoid a data loss caused by an abnormality of an operating status of a primary FEP, and effectively ensure the integrity of data acquisition by using a real-time effective prompt starting solution, thereby improving the communication reliability.

A second objective of this application is to provide a FEP.

A third objective of this application is to provide an automatic switching method for a FEP.

To achieve the foregoing objectives, an aspect of the embodiments of this application provides an automatic switching system for a FEP, including: at least one external device; and a FEP assembly, where the FEP assembly is connected to the at least one external device, the FEP assembly includes a primary FEP and at least one secondary FEP, the primary FEP includes a primary memory, a primary IO manager, and at least one primary driver, and the at least one secondary FEP includes a secondary memory, a secondary IO manager, and at least one secondary driver, where the FEP assembly provides services upward by using the primary memory, the primary IO manager, the secondary memory, and the secondary IO manager, and is connected downward to the at least one external device by the at least one primary driver and the at least one secondary driver, and the FEP assembly is configured to use the at least one secondary driver as a new primary driver when there is a fault in a communication link between the at least one primary driver and the at least one external device, to transmit a control instruction to the at least one external device and acquire data from the at least one external device.

"Upward" in this application refers to a unit that needs to receive data, and "downward" refers to an external data source device that uses the same communication protocol as a current system, which may be a monitored subsystem such as an automatic fare collection system.

In the automatic switching system for a FEP according to the embodiments of this application, when there is a fault in a communication link between a primary driver and the at least one external device, a secondary driver is used as a new primary driver, and the new primary driver acquires data from the at least one external device and transmits a control instruction to the at least one external device, to effectively avoid a data loss caused by an abnormality of an operating status of a primary FEP, and effectively ensure the integrity of data acquisition by using a real-time effective prompt starting solution, thereby improving the communication reliability.

In addition, the automatic switching system for a FEP according to the foregoing embodiment of this application may further have the following additional technical features:

In an embodiment of this application, the primary memory is configured to store data transmitted by the at least one external device; the at least one primary driver is configured to transmit a control instruction to the at least one external device, to acquire data from the at least one external device; and the primary IO manager is configured to: control the at least one primary driver according to a communication management instruction, and receive status information of the at least one external device.

In an embodiment of this application, the secondary memory synchronizes data from the primary memory of the primary FEP; the secondary IO manager is configured to: control the at least one secondary driver according to a channel diagnosis instruction, and transmit the channel diagnosis instruction to the at least one external device by using at least one of the at least one primary driver and the at least one secondary driver, where the at least one external device generates a diagnosis packet according to the channel diagnosis instruction, and the secondary IO manager is further configured to: receive status information of the at least one external device, and synchronize data with the primary IO manager; and the at least one secondary driver is configured to receive the diagnosis packet transmitted by the at least one external device, to diagnose, according to the diagnosis packet, whether there is a fault in a communication link between the primary FEP and the at least one external device and a communication link between the secondary FEP and the at least one external device.

When the primary driver and the secondary driver simultaneously transmit a channel diagnosis instruction to the at least one external device, the channel diagnosis instruction transmitted by the primary driver is used.

In an embodiment of this application, the primary IO manager is further configured to: receive device offline information of the at least one external device fed back by at least one of the at least one primary driver and the at least one secondary driver, and transmit the channel diagnosis instruction to the at least one external device by using at least one of the at least one primary driver and the at least one secondary driver.

In an embodiment of this application, when there is a fault in the communication link between the primary FEP and the at least one external device, the secondary memory communicates with the at least one secondary driver, to store data of the at least one external device, and synchronizes data with the primary memory, and when there is a fault in the communication link between the secondary FEP and the at least one external device, the primary memory communicates with the at least one primary driver, to store data of the at least one external device.

In an embodiment of this application, the at least one external device includes a first external device and a second external device, when there is a fault in a communication link between the primary FEP and the first external device and there is a fault in a communication link between the secondary FEP and the second external device, the secondary memory communicates with the at least one secondary driver to store data of the first external device, the primary memory communicates with the at least one primary driver to store data of the second external device, and the secondary memory synchronizes data with the primary memory.

In an embodiment of this application, when there is a fault in a communication link between the primary FEP and the at least one secondary FEP, the primary FEP and the at least one secondary FEP simultaneously acquire data from the at least one external device and transmit a control instruction to the at least one external device.

In an embodiment of this application, the at least one primary driver includes a first primary driver and a second primary driver, and the at least one secondary driver includes a first secondary driver and a second secondary driver, where when there is a fault in a communication link between the first primary driver and the at least one external device, the secondary memory communicates with the first secondary driver, to store data of the at least one external device, and synchronizes data with the primary memory, and when there is a fault in a communication link between the first secondary driver and the at least one external device, the primary memory communicates with the first primary driver, to store data of the at least one external device.

In an embodiment of this application, the at least one external device includes the first external device and the second external device, when there is a fault in a communication link between the first primary driver and the first external device and there is a fault in a communication link between the second secondary driver and the second external device, the secondary memory communicates with the first secondary driver to store data of the first external device, and the primary memory communicates with the second primary driver to store data of the second external device, and the secondary memory synchronizes data with the primary memory.

To achieve the foregoing objectives, a second aspect of the embodiments of this application provides a FEP, including a primary FEP and a secondary FEP, where the primary FEP includes: a primary memory, configured to store data transmitted by at least one external device; at least one primary driver, configured to transmit a control instruction to the at least one external device, to acquire data from the at least one external device; and a primary IO manager, configured to: control the at least one primary driver according to a communication management instruction, and receive status information of the at least one external device; and the secondary FEP includes: a secondary memory, configured to: synchronize data from the primary memory of the primary FEP; at least one secondary driver, configured to receive a diagnosis packet transmitted by the at least one external device, to diagnose, according to the diagnosis packet, whether there is a fault in a communication link between the primary FEP and the at least one external device and a communication link between the secondary FEP and the at least one external device; and a secondary IO manager, configured to: control the at least one secondary driver according to a channel diagnosis instruction, and transmit the channel diagnosis instruction to the at least one external device by using at least one of the at least one primary driver and the at least one secondary driver, where the at least one external device generates a diagnosis packet according to the channel diagnosis instruction, and the secondary IO manager is further configured to: receive status information of the at least one external device, and synchronize data with the primary IO manager.

In the FEP according to the embodiments of this application, when there is a fault in a communication link between a primary driver and the at least one external device, a secondary driver is used as a new primary driver, and the new primary driver acquires data from the at least one external device and transmits a control instruction to the at least one external device, to effectively avoid a data loss caused by an abnormality of an operating status of a primary FEP, and effectively ensure the integrity of data acquisition by using a real-time effective prompt starting solution, thereby improving the communication reliability.

To achieve the foregoing objectives, a third aspect of the embodiments of this application provides an automatic switching method for a FEP, performed by the system described in the foregoing embodiment. The method includes the following steps: providing services upward by using the primary memory, the primary IO manager, the secondary memory, and the secondary IO manager; connecting downward to the at least one external device by the at least one primary driver and the at least one secondary driver; using the at least one secondary driver as a new primary driver when there is a fault in a communication link between the at least one primary driver and the at least one external device, to transmit a control instruction to the at least one external device and acquire data from the at least one external device.

In the automatic switching method for a FEP according to the embodiments of this application, when there is a fault in a communication link between a primary driver and the at least one external device, a secondary driver is used as a new primary driver, and the new primary driver acquires data from the at least one external device and transmits a control instruction to the at least one external device, to effectively avoid a data loss caused by an abnormality of an operating status of a primary FEP, and effectively ensure the integrity of data acquisition by using a real-time effective prompt starting solution, thereby improving the communication reliability.

In addition, the automatic switching method for a FEP according to the foregoing embodiment of this application may further have the following additional technical features:

In an embodiment of this application, the method further includes: storing, by using the primary memory, data transmitted by the at least one external device; transmitting a control instruction to the at least one external device by using the at least one primary driver, to acquire data from the at least one external device; and controlling the at least one primary driver by using the primary IO manager according to a communication management instruction, and receiving status information of the at least one external device.

In an embodiment of this application, the method further includes: synchronizing data from the primary memory of the primary FEP by using the secondary memory; receiving, by using the at least one secondary driver, a diagnosis packet transmitted by the at least one external device, to diagnose, according to the diagnosis packet, whether there is a fault in a communication link between the primary FEP and the at least one external device and a communication link between the secondary FEP and the at least one external device; and controlling the at least one secondary driver by using the secondary IO manager according to a channel diagnosis instruction, transmitting the channel diagnosis instruction to the at least one external device by using at least one of the at least one primary driver and the at least one secondary driver, where the at least one external device generates a diagnosis packet according to the channel diagnosis instruction, and receiving, by the secondary IO manager, status information of the at least one external device, and synchronizes data with the primary IO manager.

In an embodiment of this application, the method further includes: receiving, by using the primary IO manager, device offline information of the at least one external device fed back by at least one of the at least one primary driver and the at least one secondary driver, and transmitting a channel diagnosis instruction to the at least one external device by using at least one of the at least one primary driver and the at least one secondary driver.

In an embodiment of this application, the method further includes: communicating, by the secondary memory, with the at least one secondary driver when the primary FEP detects that there is a fault in the communication link between the primary FEP and the at least one external device, to store data of the at least one external device, where the secondary memory synchronizes data with the primary memory.

In an embodiment of this application, the method further includes: communicating, by the primary memory, with the at least one primary driver when there is a fault in the communication link between the secondary FEP and the at least one external device, to store data of the at least one external device.

In an embodiment of this application, the at least one external device includes a first external device and a second external device, and the method further includes: when there is a fault in a communication link between the primary FEP and the first external device and there is a fault in a communication link between the secondary FEP and the second external device, communicating, by the secondary memory, with the at least one secondary driver to store data of the first external device, communicating, by the primary memory, with the at least one primary driver to store data of the second external device, where the secondary memory synchronizes data with the primary memory.

In an embodiment of this application, the method further includes: simultaneously acquiring, by the primary FEP and the at least one secondary FEP, data from the at least one external device when there is a fault in a communication link between the primary FEP and the at least one secondary FEP, and transmitting a control instruction to the at least one external device.

In an embodiment of this application, the at least one primary driver includes a first primary driver and a second primary driver, the at least one secondary driver includes a first secondary driver and a second secondary driver, and the method further includes: communicating, by the secondary memory, with the first secondary driver when there is a fault in a communication link between the first primary driver and the at least one external device, to store data of the at least one external device, where the secondary memory synchronizes data with the primary memory, and communicating, by the primary memory, with the first primary driver when there is a fault in a communication link between the first secondary driver and the at least one external device, to store data of the at least one external device.

In an embodiment of this application, the at least one external device includes the first external device and the second external device, and the method further includes: when there is a fault in a communication link between the first primary driver and the first external device and there is a fault in a communication link between the second secondary driver and the second external device, communicating, by the secondary memory, with the first secondary driver to store data of the first external device, and communicating, by the primary memory, with the second primary driver to store data of the second external device, where the secondary memory synchronizes data with the primary memory.

Additional aspects and advantages of this application will be given in the following description, some of which will become apparent from the following description or may be learned from practices of this application.

BRIEF DESCRIPTION OF THE DRAWINGS

The foregoing additional aspects and advantages of this application will become apparent and comprehensible in the description of embodiments made with reference to the following accompanying drawings.

DETAILED DESCRIPTION

Embodiments of this application are described in detail below, and examples of the embodiments are shown in the accompanying drawings, where the same or similar elements or the elements having the same or similar functions are denoted by the same or similar reference numerals throughout the description. The embodiments described below with reference to the accompanying drawings are exemplary, and are intended to explain this application and cannot be construed as a limitation to this application.

Before an automatic switching system for a FEP is described, the related art is correspondingly described and illustrated.

An FEP assembly is referred to as an "interface management service", and is responsible for "providing functions such as loading, executing, and stopping a driver or another interface plug-in and connecting to and disconnecting to a data source server". The FEP is a tool for acquiring real-time data of a control system by using various standard protocols or non-standard protocols such as OPC and Modbus and simultaneously writing the data into a real-time data assembly and a disk historical data assembly. An ISCS obtains data of integrated and interconnected systems by using FEPs, and also forwards data and instructions to the integrated and interconnected systems by using the FEPs.

Figure 1:
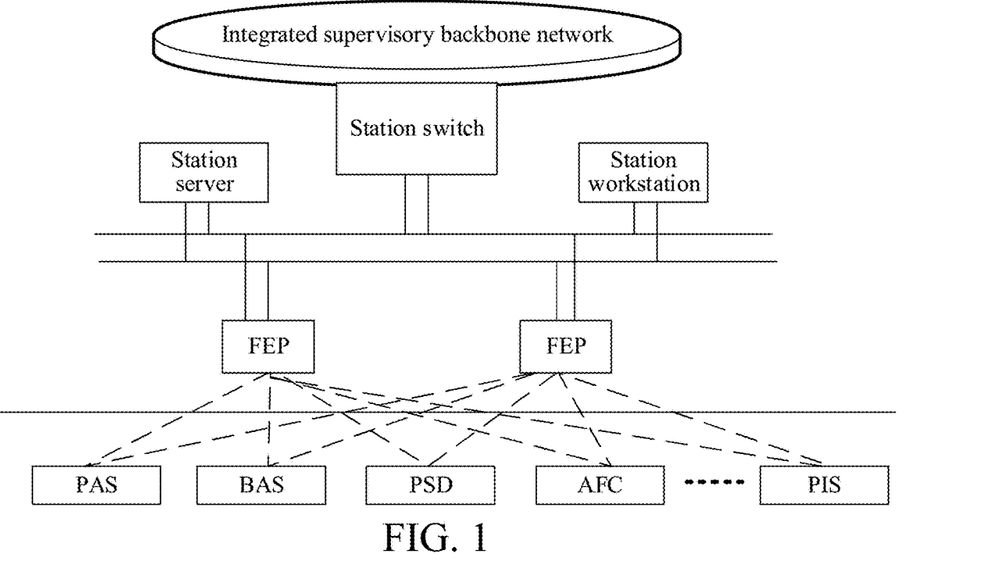
FIG. 1 is a schematic diagram of isolation between a primary system and a subsystem in the related art.

As shown in FIG. 1, the ISCS and field devices (monitored subsystems) are connected in two manners, that is, are directly connected and are isolated by using FEPs. The isolation manner has the following advantages: an abnormality of the ISCS does not affect normal operation of the subsystems, and the subsystems independently operate and work, thereby ensuring a monitoring function at a basic level of the subway; a data interference range of the subsystems may be controlled by using FEP isolation, and the FEPs convert different protocols of the subsystems into a uniform protocol of the ISCS, so that data is effectively isolated, and can be transmitted to the field by using authorized instructions, thereby effectively protecting the security of the system.

The current ISCS obtains data information of external subsystems mainly by using a method such as redundant arrays of independent disks (RAID) and a data backup. The RAID simultaneously stores and reads data in a plurality of disks, to greatly improve a data throughput of a storage system. In the RAID, a number of disk drivers may be allowed to transmit data simultaneously. However, the disk drivers are one disk driver in logic. RAID fault tolerance is established based on a hardware fault tolerance function of each disk driver. In many RAID modes, there are a relatively complete measure for mutual verification or restoration and even a direct mutual mirror backup.

The RAID, referred to as a disk array for short, is a disk group with extremely large capacity formed by a plurality of disks, and provides a data additive effect by using at least one disk, to improve the effectiveness of the entire disk system. However, this technology has some disadvantages:

First, the design of a controller is very complex, a considerable amount of processing time needs to be used to calculate a verification address, data transmission is prone to interruption, and consequently, the system cannot stably operate in real time.

Second, the costs are high, and when a host environment is damaged, if complete restoration of a configuration cannot be ensured, data in a disk array may fail to be restored, causing inconvenience to fault analysis of the system and query of historical data.

Finally, after a fault occurs, a restoration time of the system is relatively long, and a single vendor patent form results in the exclusiveness of the solution.

Affected by a conventional data backup thought, only simple data redundancy is performed in advance, there is no real-time effective backup prompt starting solution for the ISCS on a rail, and consequently, a warning notification cannot be passed immediately.

Based on the foregoing reasons, the embodiments of this application provide an automatic switching system for a FEP.

The automatic switching system for a FEP provided in the embodiments of this application is described below with reference to the accompanying drawings, and a schematic structural diagram of the automatic switching system for a FEP provided in the embodiments of this application is described first with reference to the accompanying drawings.

Figure 2:
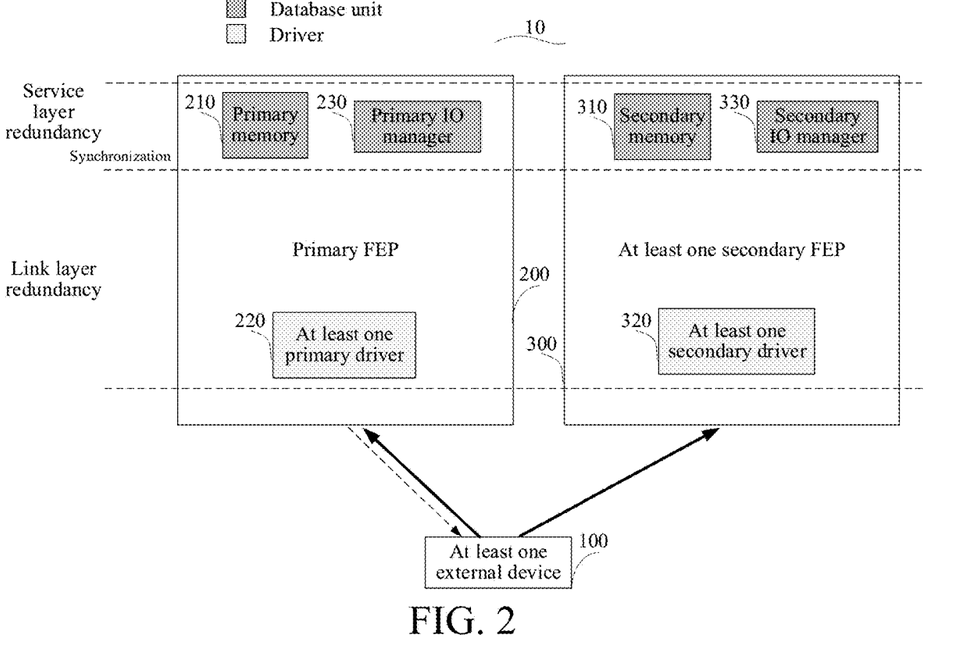
FIG. 2 is a schematic structural diagram of an automatic switching system for a FEP according to an embodiment of this application.

FIG. 2 is a schematic structural diagram of an automatic switching system for a FEP according to an embodiment of this application.

As shown in FIG. 2, the automatic switching system 10 for a FEP includes at least one external device 100 and a FEP assembly (not specifically marked in the figure).

The FEP assembly is connected to the at least one external device 100, and the FEP assembly includes a primary FEP 200 and at least one secondary FEP 300. The primary FEP 100 includes a primary memory 210, at least one primary driver 220, and a primary JO manager 230. The at least one secondary FEP 300 includes a secondary memory 310, at least one secondary driver 320, and a secondary JO manager 330.

The FEP assembly provides services upward by using the primary memory 210, the primary JO manager 230, the secondary memory 310, and the secondary JO manager 330, and is connected downward to the at least one external device 100 by the at least one primary driver 220 and the at least one secondary driver 320. The FEP assembly is configured to use the at least one secondary driver 220 as a new primary driver when there is a fault in a communication link between the at least one primary driver 220 and the at least one external device 100, to transmit a control instruction to the at least one external device 100 and acquire data from the at least one external device 100.

Figure 3:
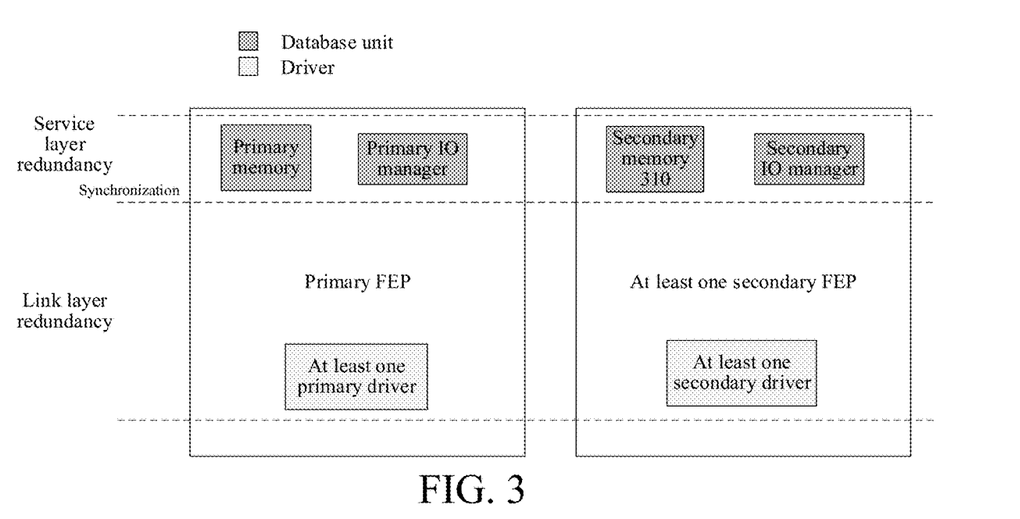
FIG. 3 is a schematic diagram of two-layer redundancy and single-layer synchronization according to an embodiment of this application.

It should be noted that, as shown in FIG. 3, the automatic switching system 10 for a FEP is an automatic switching system with two-layer redundancy and single-machine backup. The two-layer redundancy includes service layer redundancy and link layer redundancy. The service layer redundancy refers to a layer of redundancy used when the FEP assembly provides services upward. Specifically, in the embodiments of this application, the FEP assembly provides services upward by using the primary memory 210, the primary IO manager 230, the secondary memory 310, and the secondary IO manager 330. The link layer redundancy refers to a layer of redundancy used when the FEP assembly is connected downward to a device. Specifically, in the embodiments of this application, the FEP assembly is connected downward to a device by the at least one primary driver 220 and the at least one secondary driver 320. The service layer redundancy and the link layer redundancy are independent of each other and do not affect each other.

Figure 4:
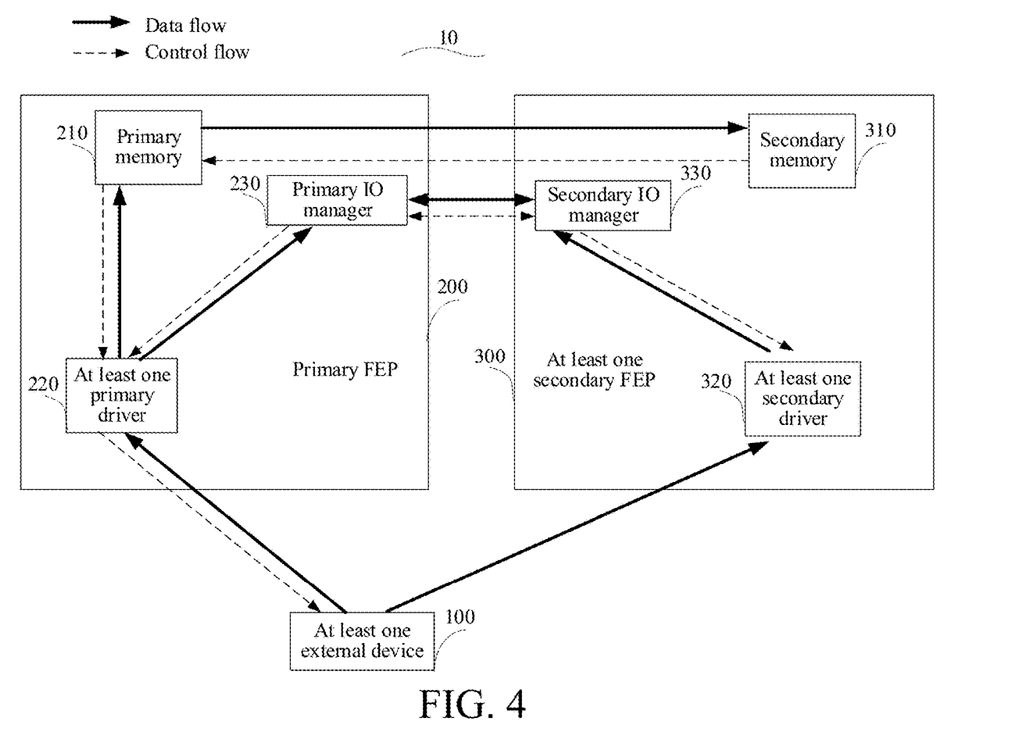
FIG. 4 is a schematic structural diagram of an automatic switching system for a FEP according to another embodiment of this application.

In an embodiment of this application, as shown in FIG. 4, the primary memory 210 is configured to store data transmitted by the at least one external device 100. The at least one primary driver 220 is configured to transmit a control instruction to the at least one external device 100, to acquire data from the at least one external device 100. The primary IO manager 230 is configured to: control the at least one primary driver 220 according to a communication management instruction, and receive status information of the at least one external device 100.

It may be understood that, the at least one primary driver 220 is connected to the at least one external device 100 in a one-to-one correspondence. Therefore, a specific arrangement quantity of the at least one primary drivers 220 is set according to an arrangement quantity of the at least one external devices 100.

In an embodiment of this application, as shown in FIG. 4, the secondary memory 310 synchronizes data from the primary memory of the primary FEP 200. The at least one secondary driver 310 is configured to receive a diagnosis packet transmitted by the at least one external device 100, to diagnose, according to the diagnosis packet, whether there is a fault in a communication link between the primary FEP 200 and the at least one external device 100 and a communication link between the secondary FEP 300 and the at least one external device 100. The secondary IO manager 330 is configured to: control the at least one secondary driver 320 according to a channel diagnosis instruction, receive status information of the at least one external device, synchronize data with the primary IO manager 230, and transmit the channel diagnosis instruction to the at least one external device 100 by using at least one of the at least one primary driver 220 and the at least one secondary driver 320, where the at least one external device 100 generates a diagnosis packet according to the channel diagnosis instruction.

It may be understood that, the at least one secondary driver 310 is connected to the at least one external device 100 in a one-to-one correspondence. Therefore, a specific arrangement quantity of the at least one secondary drivers 310 is set according to an arrangement quantity of the at least one external device 100.

It should be noted that, the automatic switching system 10 for a FEP in the embodiments of this application may include one primary FEP 200 and one secondary FEP 300, or may include one primary FEP 200 and a plurality of secondary FEPs 300. Certainly, a person skilled in the art may set a quantity of the secondary FEPs 300 according to an actual case, and this is not specifically limited herein. An embodiment in which the automatic switching system 10 for a FEP may include one primary FEP 200 and one secondary FEP 300 is described below in detail.

Figure 5:
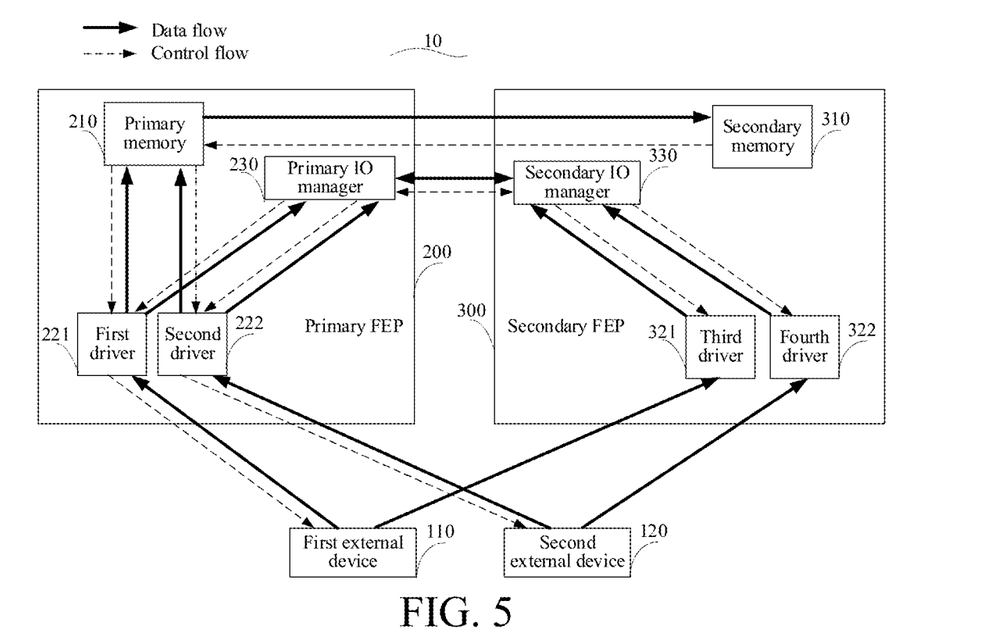
FIG. 5 is a schematic structural diagram of an automatic switching system for a FEP according to a specific embodiment of this application.

In the following example, a working procedure of the automatic switching system 10 for a FEP in the embodiments of this application under a normal condition is first described in detail. For example, as shown in FIG. 5, the at least one external device 100 may include a first external device 110 and a second external device 120. The at least one primary driver 220 may include a first driver (a first primary driver 221) and a second driver (a second primary driver 222). The at least one secondary driver 320 may include a third driver (a first secondary driver 321) and a fourth driver (a second secondary driver 322).

Specifically, the automatic switching system 10 for a FEP includes the first external device 110, the second external device 120, the primary FEP 200, and the secondary FEP 300.

Specifically, both the primary FEP 200 and the secondary FEP 300 are connected to the first external device 110 and the second external device 120. The primary FEP 200 includes the first primary driver 221 and the second primary driver 222 that are respectively connected to the first external device 110 and the second external device 120 as well as the primary memory 210 and the primary TO manager 230 that are respectively connected to the first primary driver 221 and the second primary driver 222. The secondary FEP 300 includes the first secondary driver 321 and the second secondary driver 322 that are respectively connected to the first external device 110 and the second external device 120, the secondary memory 310, and the secondary TO manager 330 that is connected to both the first secondary driver 321 and the second secondary driver 322. The first primary driver 221 and the second primary driver 222 are configured to respectively transmit control instructions to the first external device 110 and the second external device 120, and respectively acquire data from the first external device 110 and the second external device 120. The first secondary driver 321 and the second secondary driver 322 are configured to receive diagnosis packets transmitted by the first external device 110 and the second external device 120.

When the automatic switching system 10 for a FEP works under a normal working condition, the first driver (the first primary driver 221) and the second driver (the second primary driver 222) are respectively responsible for data acquisition and command delivery for the first external device 110 and the second external device 120. The first driver (the first primary driver 221) and the second driver (the second primary driver 222) may update data of the primary FEP 200, and after receiving a control instruction, the primary FEP 200 delivers the control instruction to the first driver (the first primary driver 221) and the second driver (the second primary driver 222). The third driver (the first secondary driver 321) and the fourth driver (the second secondary driver 322) only have uplink data. That is, the third driver (the first secondary driver 321) and the fourth driver (the second secondary driver 322) are only configured to receive uplink data transmitted by the first external device 110 and the second external device 120. The uplink data is only used for channel diagnosis. After receiving diagnosis packets of the first external device 110 and the second external device 120, the third driver (the first secondary driver 321) and the fourth driver (the second secondary driver 322) directly discard the diagnosis packets, and set the first external device 110 and the second external device 120 to be online.

There is no interaction between the first secondary driver 321 and the secondary FEP 300 and between the second secondary driver 322 and the secondary FEP. That is, in a normal working condition, the first secondary driver 321 and the second secondary driver 322 are only used for data redundancy, and do not upload data. The first primary driver 221 and the first secondary driver 321 maintain data synchronization, and the second primary driver 222 and the second secondary driver 322 maintain data synchronization. Therefore, data of the first primary driver 221 and the second primary driver 222 only need to be uploaded in real time to the primary FEP 200, and the secondary FEP 300 synchronizes the real-time data from the primary FEP 200, thereby ensuring data integrity when there is a fault in the device. As shown in FIG. 5, in the normal working condition, the secondary FEP 300 forwards a data operation command to the primary FEP 200.

According to a rule for determining a default primary link and secondary link, it is set by default that the first primary driver 221 and the second primary driver 222 are primary channels, and the first secondary driver 321 and the second secondary driver 322 are secondary channels. The rule for determining a default primary link and secondary link specifically includes:

setting the default primary link and secondary link by first determining an identity (for example, a machine A or a machine B) of a current operating machine and a load sharing principle (for example, the machine A takes priority or the machine B takes priority) of a redundancy configuration of a link, which is as follows:

a) if the current machine is the machine A and the machine A takes priority in the link, the link is set to the primary link by default;

b) if the current machine is the machine A and the machine B takes priority in the link, the link is set to the secondary link by default;

c) if the current machine is the machine B and the machine A takes priority in the link, the link is set to the secondary link by default; and d) if the current machine is the machine B and the machine B takes priority in the link, the link is set to the primary link by default.

A weight value of a link is a value that is dynamically calculated, and is determined according to an online status of devices on the link. When there are more online devices, the link has a larger weight value, and when there are fewer online devices, the link has a smaller weight value. An actual primary link and secondary link in two links that are mutually redundant are determined by using weight values of the links. A link with a larger weight value is the primary link, and a link with a smaller weight value is the secondary link. If weight values of the two links are the same, the default primary link and secondary link are used. When the weight values of the links change, the actual primary link and secondary link need to be determined again. When the secondary link cannot be connected to the primary link, the secondary link is directly used as the primary link. The primary link is responsible for acquiring data, and the secondary link synchronizes data from the primary link. Data synchronization between the primary link and the secondary link can effectively ensure the data integrity when there are cross faults in redundant communication links.

In addition, the embodiments of this application further support conflict diagnosis of serial links. The embodiments of this application further support mandatory switching between primary and secondary states of a communication link. That is, a primary or secondary state of a communication link may be mandatorily set. After primary and secondary states are mandatorily set, primary and secondary states of communication links on the two machines should change accordingly, to avoid a case in which there are two primary links or there are two secondary links. After mandatory setting of primary and secondary states are is canceled, the primary and secondary states of the communication links are switched to values before the mandatory setting.

In an embodiment of this application, the primary IO manager 230 and the secondary IO manager 330 communicate with each other to synchronize states of the first external device 110 and the second external device 120.

It may be understood that, the primary IO manager 230 and the secondary IO manager 330 are configured to manage status information, and implement data synchronization and redundancy between channels.

Specifically, the first primary driver 221 uploads a channel status and a device status of the first external device 110 to the primary IO manager 230, the second primary driver 222 also uploads a channel status and a device status of the second external device 120 to the primary IO manager, and after receiving a communication management instruction, the primary IO manager 230 delivers the communication management instruction to a corresponding driver. The first secondary driver 321 uploads a channel status and a device status of the first external device 110 to the secondary IO manager 330, the second secondary driver 322 also uploads a channel status and a device status of the second external device 120 to the secondary IO manager, and after receiving a channel diagnosis instruction, the secondary IO manager 330 delivers the channel diagnosis instruction to a corresponding driver. The primary IO manager 230 and the secondary IO manager 330 communicate with each other to synchronize states of the first external device 110 and the second external device 120, and the communication management instruction may be forwarded between the primary IO manager 230 and the secondary IO manager 330.

In an embodiment of this application, the primary memory 210 is further configured to: receive a control instruction transmitted by the secondary memory 310, and transmit the control instruction to the first external device 110 and the second external device 120 by using the first primary driver 221 and the second primary driver 222.

In summary, when the automatic switching system 10 for a FEP works under a normal working condition, data acquisition and command delivery are performed by using the first primary driver and the second primary driver, and the first secondary driver and the second secondary driver are only used for data redundancy. Therefore, not only an amount of redundant data uploaded to the memory can be effectively reduced, to improve the communication reliability, but also the data integrity can be effectively ensured by using data redundancy when there is a fault.

The foregoing embodiment describes a working condition of the automatic switching system 10 for a FEP under a normal working condition, and the following is to describe a working procedure of the automatic switching system 10 for a FEP under an abnormal condition.

When there is a fault in a single device in the automatic switching system 10 for a FEP, in an embodiment of this application, the primary IO manager 230 is further configured to: receive device offline information of the at least one external device 100 fed back by at least one of the at least one primary driver 220 and the at least one secondary driver 320, and transmit a channel diagnosis instruction to the at least one external device 100 by using at least one of the at least one primary driver 220 and the at least one secondary driver 320.

Figure 6:
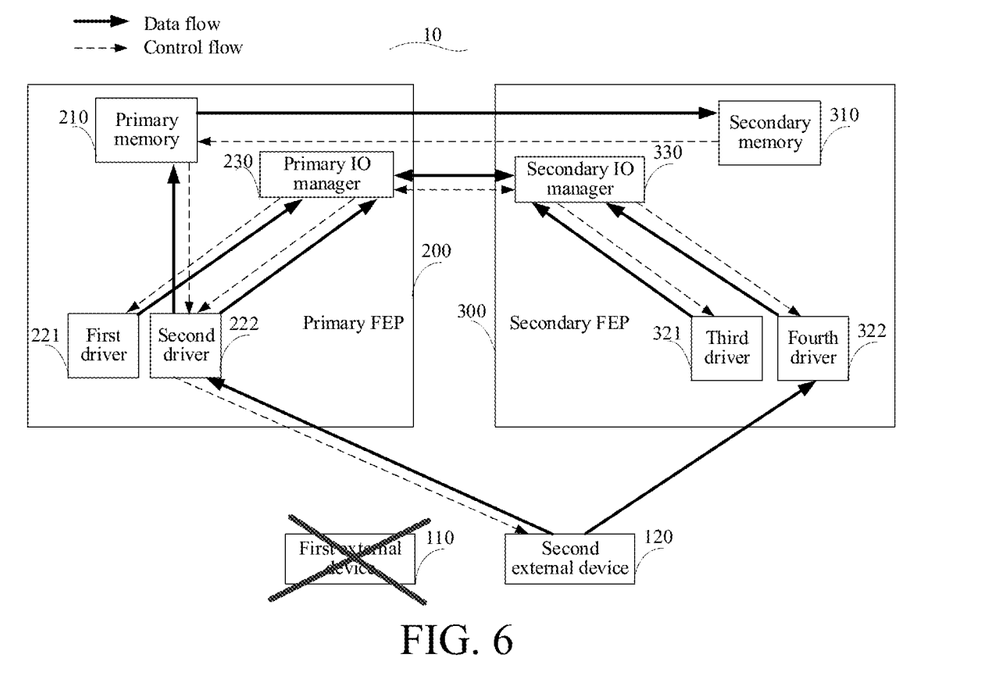
FIG. 6 is a diagram of a data flow when there is a fault in a single device according to an embodiment of this application.

For example, as shown in FIG. 6, assuming that the first external device 110 is offline, and the second external device 120 is normal, the primary IO manager 230 may receive device offline information of the first external device 110 fed back by the first primary driver 221, or synchronize information from the secondary IO manager 330 to receive device offline information of the first external device 110 fed back by the first secondary driver 321, or receive the device offline information of the first external device 110 fed back by the first primary driver 221, and simultaneously synchronize information from the secondary IO manager 330 to receive fault information of the first external device 110 fed back by the first secondary driver 321, thereby synchronizing the device offline information of the first external device 110 to the primary IO manager 230 and the secondary IO manager 330. In addition, because the device offline information of the first external device 110 is received, channel statuses of both the first primary driver 221 and the first secondary driver 321 are set to faulty. In this case, the primary IO manager 230 may further deliver a channel diagnosis instruction by using the first primary driver 221, or communicate with the secondary IO manager 330 to deliver the channel diagnosis instruction by using the first secondary driver 321, or deliver the channel diagnosis instruction by using both the first primary driver 221 and the first secondary driver 321.

In the foregoing embodiment, when there is a fault in a single device in the automatic switching system 10 for a FEP, channel statuses of both a primary channel and a secondary channel that are connected to the device are set to be faulty, and offline information of the faulty device is updated to the primary IO manager 230 and the secondary IO manager 330. In this case, other devices are not affected and still work normally.

When there is a fault in a single link in the automatic switching system 10 for a FEP, in an embodiment of this application, when there is a fault in the communication link between the primary FEP 200 and the at least one external device 100, the secondary memory 310 communicates with the at least one secondary driver 320, to store data of the at least one external device 100, and the secondary memory 310 synchronizes data with the primary memory 210.

It may be understood that, the case is the same when there are faults in communication links between the primary FEP 200 and a plurality of external devices. Therefore, an example in which there is a fault in a communication link between the primary FEP 200 and one external device is used, and for detailed description, description is made by using an example in which the at least one primary driver 220 may include the first primary driver 221 and the second primary driver 222, and the at least one secondary driver 320 includes the first secondary driver 321 and the second secondary driver 322.

In an embodiment of this application, when there is a fault in a communication link between first primary driver 220 and the at least one external device 100, the secondary memory 310 communicates with the first secondary driver 320, to store data of the at least one external device 100, and the secondary memory 310 synchronizes data with the primary memory 210.

Figure 7:
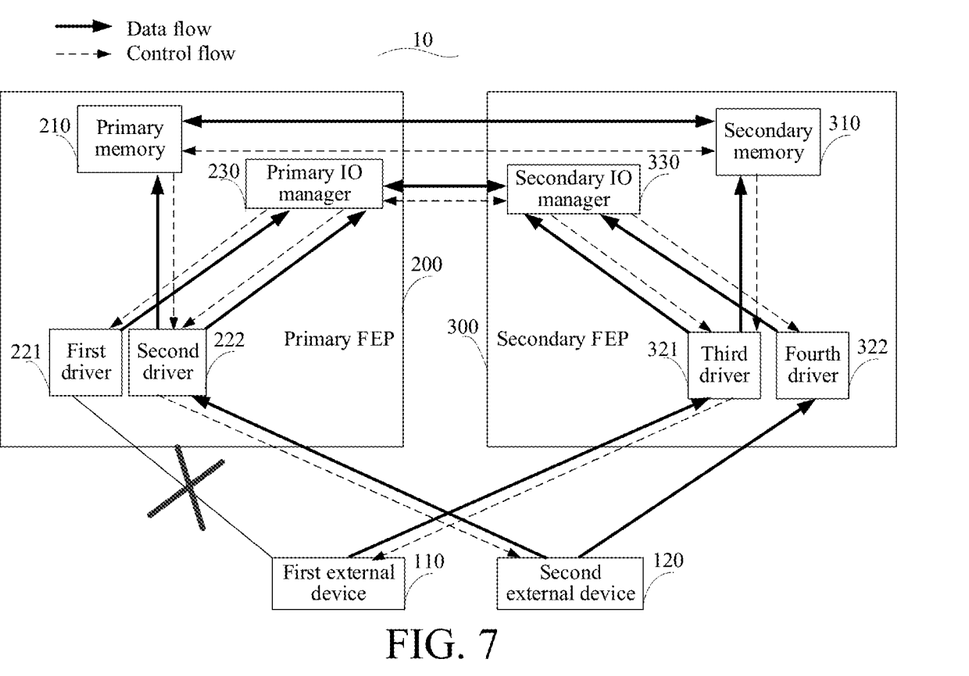
FIG. 7 is a diagram of a data flow when there is a fault in a single link according to an embodiment of this application.

For example, as shown in FIG. 7, there is a connection fault between the first external device 110 and the first primary driver 221. In this case, because data acquisition and command delivery cannot be performed on the first external device 110 by using the first primary driver 221, the first primary driver 221 may be disconnected from the first external device 110, a channel status of the first primary driver 221 is set to be faulty, and a communication link between the first external device and the first secondary driver is switched to be the primary channel. Because the primary memory 210 cannot perform data acquisition and command delivery on the first external device 110 by using the first primary driver 221, a connection between the first secondary driver 321 and the secondary memory 310 is established. Therefore, when there is a connection fault between the first external device and the first primary driver, a communication link between the first external device and the first secondary driver is promptly switched to be the primary channel, so that data acquisition may seamlessly continue to be performed on the first external device, thereby ensuring the integrity of the data acquired from the first external device.

In this case, the primary memory 210 synchronizes data with the secondary memory 310. The primary memory 210 synchronizes data of the first external device 110 from the secondary FEP 300, the secondary memory 310 synchronizes data of the second external device 120 from the primary memory 210, the primary memory 210 forwards, to the secondary memory 310, a command delivered to the first external device 110, and the secondary memory 310 forwards, to the primary memory 210, a command delivered to the second external device 120.

In an embodiment of this application, when there is a fault in the communication link between the secondary FEP 300 and the at least one external device 100, the primary memory 200 communicates with the at least one primary driver 220, to store data of the at least one external device 100.

It may be understood that, the case is the same when there are faults in communication links between the secondary FEP 300 and a plurality of external devices. Therefore, an example in which there is a fault in a communication link between the secondary FEP 300 and one external device is used, and for detailed description, description is made by using an example in which the at least one primary driver 220 may include the first primary driver 221 and the second primary driver 222, and the at least one secondary driver 320 includes the first secondary driver 321 and the second secondary driver 322.

In an embodiment of this application, when there is a fault in a communication link between the first secondary driver 320 and the at least one external device 100, the primary memory 210 communicates with the first primary driver 221, to store data of the at least one external device 100.

Figure 8:
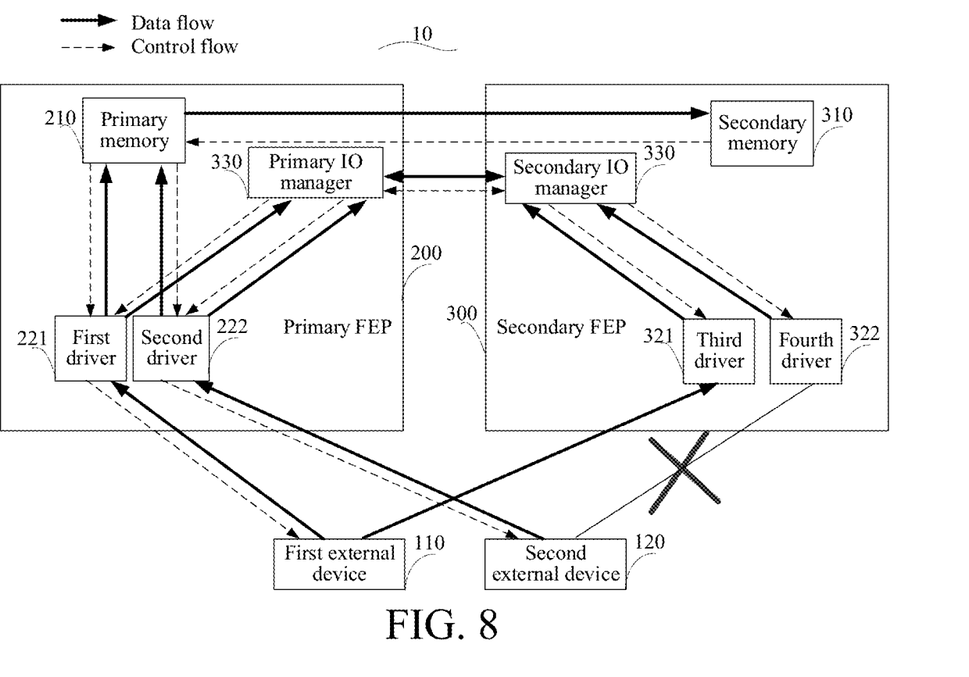
FIG. 8 is a diagram of a data flow when there is a connection fault between a default secondary driver and a device according to an embodiment of this application.

For example, as shown in FIG. 8, there is a connection fault between the first external device 110 and the first secondary driver 321. Because there is a fault in the secondary link, a channel status of the first secondary driver 321 needs to be set to be faulty. Because data in the secondary link is redundant, data acquisition from the first external device 110 is not affected. Therefore, the working procedure is substantially the same as that under the normal working condition.

The foregoing embodiment describes a case in which there is a fault in a single link in the automatic switching system 10 for a FEP. When there is a fault in the communication link between the primary FEP and the at least one external device, a communication link that is between the secondary FEP and the at least one external device and corresponds to the device is promptly switched to be the primary link, and a connection between the secondary channel and the corresponding secondary memory is established. Therefore, a link is switched promptly when there is a fault in the communication link between the primary FEP and the at least one external device, which can effectively ensure the integrity of data acquired from the device, and improve the intelligence, flexibility, and reliability of automatic switching of the FEP, thereby avoiding a data loss due to a damage to the link, and setting a channel status of the secondary channel to be faulty when there is a connection fault between the device and the secondary channel, to still normally acquire data.

When there are cross link faults in the automatic switching system 10 for a FEP, a case in which there are cross faults between a plurality of external devices and the primary FEP and between the plurality of external devices and the secondary FEP is the same as a case in which there are cross faults between two external devices and the primary FEP and between the two external devices and the secondary FEP. Therefore, in an embodiment of this application, an example in which the at least one external device 100 includes the first external device 110 and the second external device 120 is used. When there is a fault in a communication link between the primary FEP 200 and the first external device 110 and there is a fault in a communication link between the secondary FEP 200 and the second external device 120, the secondary memory 310 communicates with the at least one secondary driver 320 to store data of the first external device 110, the primary memory 210 communicates with the at least one primary driver 220 to store data of the second external device 120, and the secondary memory 320 synchronizes data with the primary memory 220.

It may be understood that, a case in which there are cross faults between a plurality of primary drivers and a plurality of secondary drivers and the first external device 110 and the second external device 120 is the same as a case in which there are cross faults between two primary drivers and two secondary drivers and the first external device 110 and the second external device 120. Therefore, description is made by using an example in which the at least one primary driver includes the first primary driver and the second primary driver and the at least one secondary driver includes the first secondary driver and the second secondary driver.

In an embodiment of this application, when there is a fault in a communication link between the first primary driver 221 and the first external device 110 and there is a fault in a communication link between the second secondary driver 322 and the second external device 120, the secondary memory 310 communicates with the first secondary driver 321 to store data of the first external device 110, and the primary memory 210 communicates with the second primary driver 222 to store data of the second external device 120, and the secondary memory 310 synchronizes data with the primary memory 210.

It should be noted that, a data flow in a case in which there are cross link faults is substantially the same as the data flow in a case in which there is a fault in a single link and that is described in the foregoing embodiment.

Figure 9:
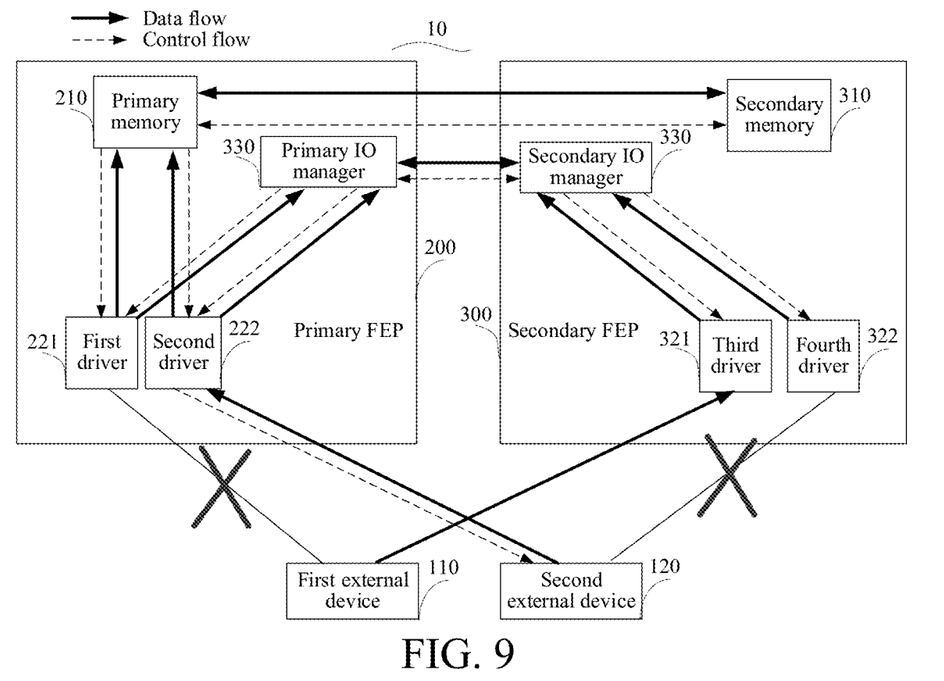
FIG. 9 is a diagram of a data flow when there are cross faults according to an embodiment of this application.

For example, as shown in FIG. 9, there is a connection fault between the first external device 110 and the first primary driver 221, and there is also a connection fault between the second external device 120 and the second secondary driver 322. In this case, the working condition is substantially the same as the working condition when there is a fault in a single link, and reference may be made to the description in the foregoing embodiment. When there are cross link faults in the automatic switching system 10 for a FEP, if a link is switched promptly, the integrity of data acquired from the device can be effectively ensured, and the intelligence, flexibility, and reliability of automatic switching of the FEP can be improved, thereby avoiding a data loss due to a damage to the link, and setting a channel status of the secondary channel to be faulty when there is a connection fault between the device and the secondary channel, to still normally acquire data.

In an embodiment of this application, when the primary FEP 200 detects that there is a fault in a communication link between the primary FEP 200 and the at least one secondary FEP 300, the primary FEP 200 and the at least one secondary FEP 200 simultaneously acquire data from the at least one external device and transmit a control instruction to the at least one external device.

Figure 10:
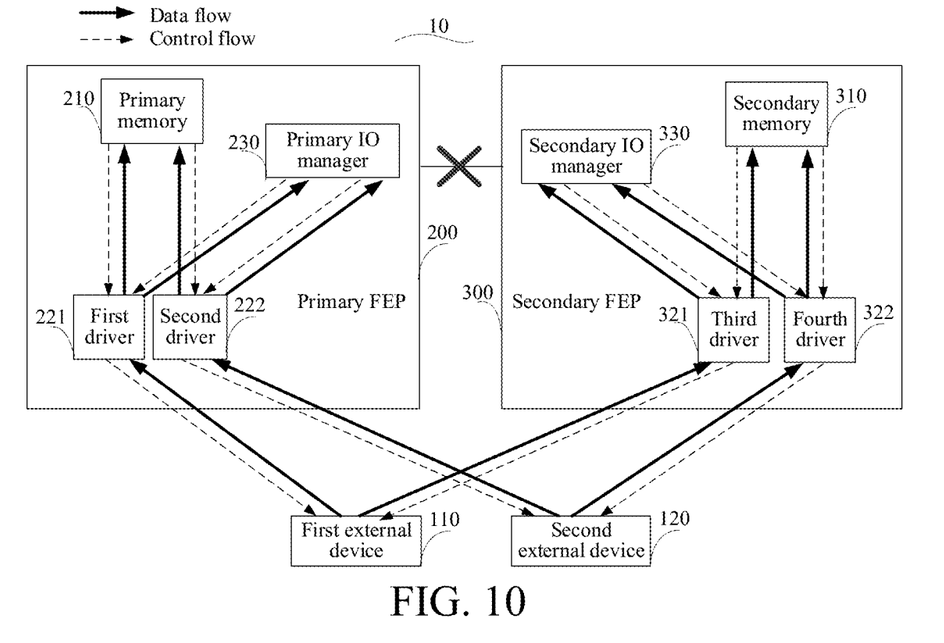
FIG. 10 is a diagram of a data flow when there is a two-machine communication fault according to an embodiment of this application.

For example, when there is a two-machine communication fault in the automatic switching system 10 for a FEP, that is, when there is a communication fault between the primary FEP 200 and the secondary FEP 300, as shown in FIG. 10, the primary FEP 200 and the secondary FEP 300 are separately used as primary processors, the primary IO manager 230 does not communicate with the secondary IO manager 330 and the primary memory 210 does not communicate with the secondary memory 310. In addition, both the first secondary driver 321 and the second secondary driver 322 are set to be primary channels, and establish connections with the secondary memory 310. The secondary memory 310 performs data acquisition and command delivery on the first external device 110 and the second external device 120 respectively by using the first secondary driver 321 and the second secondary driver 322. When there is a two-machine communication fault in the automatic switching system 10 for a FEP, the secondary channel is promptly switched to be the primary channel, and connections to the secondary memory are established, thereby effectively ensuring data redundancy, ensuring the data integrity, and improving the intelligence, flexibility, and reliability of automatic switching of the FEP.

It should be noted that, data exchange is performed between the automatic switching system for a FEP and the host in packets, to reduce a quantity of interruptions of the host. When there is a fault in the host, the FEPs can still maintain a degraded service of a data communication system, to complete functions of receiving, storage, and forwarding a packet, and the FEPs may form a two-machine system structure, which effectively improves the reliability of the communication system, thereby effectively ensuring the data integrity and communication reliability. A link is switched promptly when there is a fault in a communication link, facilitating expansion and modification of functions, which is of great flexibility, can meet requirements of adding terminals, increasing a communication rate, and service change, and is applicable to communication environments with different communication rates, control manners, synchronization manners, and code formats.

In summary, when the automatic switching system for a FEP provided according to the embodiments of this application works under a normal working condition, data acquisition and command delivery are performed by using the first primary driver and the second primary driver, and the first secondary driver and the second secondary driver are only used for data redundancy. Therefore, not only an amount of redundant data uploaded to the memory can be effectively reduced, to improve the communication reliability, but also the data integrity can be effectively ensured by using data redundancy when there is a fault. In addition, when there is a fault in the automatic switching system for a FEP, switching is performed promptly according to a fault type, thereby effectively ensuring the data integrity, and improving the intelligence, flexibility, and reliability of automatic switching of the FEP, which is simple and easy to implement.

The foregoing embodiment describes, in detail, a case in which the automatic switching system 10 for a FEP may include one primary FEP 200 and one secondary FEP 300. In another embodiment of this application, the automatic switching system 10 may include one primary FEP 200 and a plurality of secondary FEPs 300. When the primary FEP 200 is completely faulty, any secondary FEP may be set as a new primary FEP. For a detailed description, reference may be made to the detailed description in the foregoing embodiment, and to avoid redundancy, details are not described herein again.

Referring to the accompanying drawings, a FEP provided according to the embodiments of this application is described.

As shown in FIG. 4, the FEP includes a primary FEP 200 and a secondary FEP 300.

The primary FEP 200 includes a primary memory 210, at least one primary driver 220, and a primary IO manager 230. The primary memory 210 is configured to store data transmitted by at least one external device 100. The at least one primary driver 220 is configured to transmit a control instruction to the at least one external device 100, to acquire data from the at least one external device 100. The primary IO manager 230 is configured to: control the at least one primary driver 210 according to a communication management instruction, and receive status information of the at least one external device 100.

The secondary FEP 300 includes: a secondary memory 310, at least one secondary driver 320, and a secondary IO manager 330. The secondary memory 310 is configured to synchronize data from the primary memory 210 of the primary FEP 200. The at least one secondary driver 320 is configured to receive a diagnosis packet transmitted by the at least one external device 100, to diagnose, according to the diagnosis packet, whether there is a fault in a communication link between the primary FEP 200 and the at least one external device 100 and a communication link between the secondary FEP 300 and the at least one external device 100. The secondary IO manager 330 is configured to: control the at least one secondary driver 320 according to a channel diagnosis instruction, and transmit the channel diagnosis instruction to the at least one external device 100 by using at least one of the at least one primary driver 220 and the at least one secondary driver 320, where the at least one external device 100 generates a diagnosis packet according to the channel diagnosis instruction, and the secondary IO manager is further configured to receive status information of the at least one external device 100, and synchronize data with the primary IO manager 230.

In the FEP according to the embodiments of this application, when there is a fault in a communication link between a primary driver and the at least one external device, a secondary driver is used as a new primary driver, and the new primary driver acquires data from the at least one external device and transmits a control instruction to the at least one external device, to effectively avoid a data loss caused by an abnormality of an operating status of a primary FEP, and effectively ensure the integrity of data acquisition by using a real-time effective prompt starting solution, thereby improving the communication reliability.

In addition, referring to the accompanying drawings, an automatic switching method for a FEP provided according to the embodiments of this application is described.

Figure 11:
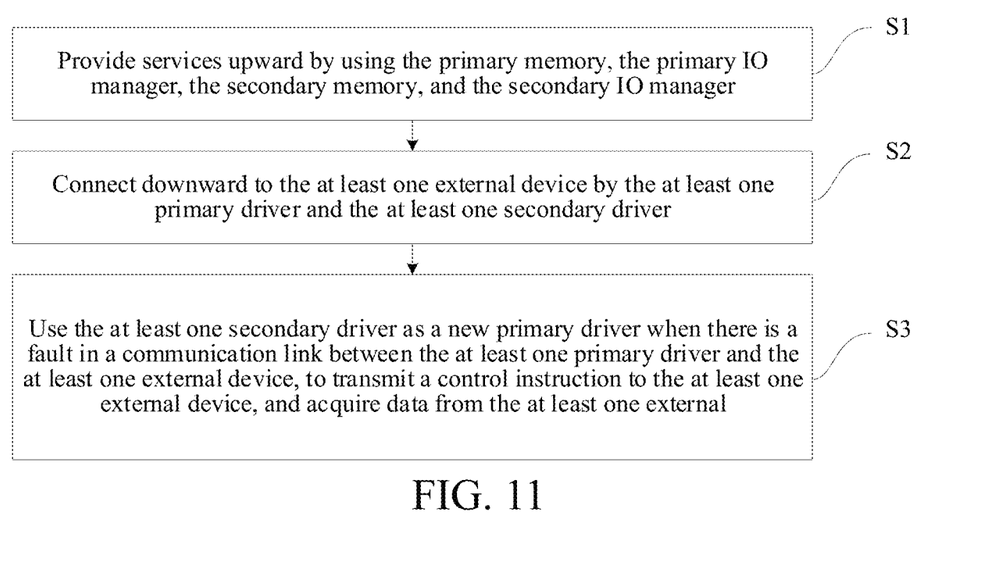
FIG. 11 is a flowchart of an automatic switching method for a FEP according to an embodiment of this application.

FIG. 11 is a flowchart of an automatic switching method for a FEP according to an embodiment of this application.

As shown in FIG. 11, the automatic switching method for a FEP is performed by the system in the foregoing embodiments. The method includes the following steps:

Step S1: Provide services upward by using the primary memory, the primary IO manager, the secondary memory, and the secondary IO manager.

Step S2: Connect downward to the at least one external device by the at least one primary driver and the at least one secondary driver.

Step S3: Use the at least one secondary driver as a new primary driver when there is a fault in a communication link between the at least one primary driver and the at least one external device, to transmit a control instruction to the at least one external device and acquire data from the at least one external device.

In an embodiment of this application, the method further includes: storing, by using the primary memory, data transmitted by the at least one external device; transmitting a control instruction to the at least one external device by using the at least one primary driver, to acquire data from the at least one external device; and controlling the at least one primary driver by using the primary IO manager according to a communication management instruction, and receiving status information of the at least one external device.

In an embodiment of this application, the method further includes: synchronizing data from the primary memory of the primary FEP by using the secondary memory; receiving, by using the at least one secondary driver, a diagnosis packet transmitted by the at least one external device, to diagnose, according to the diagnosis packet, whether there is a fault in a communication link between the primary FEP and the at least one external device and a communication link between the secondary FEP and the at least one external device; and controlling the at least one secondary driver by using the secondary IO manager according to a channel diagnosis instruction, transmitting the channel diagnosis instruction to the at least one external device by using at least one of the at least one primary driver and the at least one secondary driver, where the at least one external device generates a diagnosis packet according to the channel diagnosis instruction, receiving, by using the secondary IO manager, status information of the at least one external device, and synchronizing data with the primary IO manager.

In an embodiment of this application, the method further includes: receiving, by using the primary IO manager, device offline information of the at least one external device fed back by at least one of the at least one primary driver and the at least one secondary driver, and transmitting a channel diagnosis instruction to the at least one external device by using at least one of the at least one primary driver and the at least one secondary driver.

In an embodiment of this application, the method further includes: communicating, by the secondary memory, with the at least one secondary driver when the primary FEP detects that there is a fault in the communication link between the primary FEP and the at least one external device, to store data of the at least one external device, where the secondary memory synchronizes data with the primary memory.

In an embodiment of this application, the method further includes: communicating, by the primary memory, with the at least one primary driver when there is a fault in the communication link between the secondary FEP and the at least one external device, to store data of the at least one external device.

In an embodiment of this application, the at least one external device includes a first external device and a second external device, and the method further includes: when there is a fault in a communication link between the primary FEP and the first external device and there is a fault in a communication link between the secondary FEP and the second external device, communicating, by the secondary memory, with the at least one secondary driver to store data of the first external device, communicating, by the primary memory, with the at least one primary driver to store data of the second external device, where the secondary memory synchronizes data with the primary memory.

In an embodiment of this application, the method further includes: simultaneously acquiring, by the primary FEP and the at least one secondary FEP, data from the at least one external device when there is a fault in a communication link between the primary FEP and the at least one secondary FEP, and transmitting a control instruction to the at least one external device.

In an embodiment of this application, the at least one primary driver includes a first primary driver and a second primary driver, the at least one secondary driver includes a first secondary driver and a second secondary driver, and the method further includes: communicating, by the secondary memory, with the first secondary driver when there is a fault in a communication link between the first primary driver and the at least one external device, to store data of the at least one external device, where the secondary memory synchronizes data with the primary memory.

In an embodiment of this application, the method further includes: communicating, by the primary memory, with the first primary driver when there is a fault in a communication link between the first secondary driver and the at least one external device, to store data of the at least one external device.

In an embodiment of this application, the at least one external device includes the first external device and the second external device, and the method further includes: when there is a fault in a communication link between the first primary driver and the first external device and there is a fault in a communication link between the second secondary driver and the second external device, communicating, by the secondary memory, with the first secondary driver to store data of the first external device, and communicating, by the primary memory, with the second primary driver to store data of the second external device, where the secondary memory synchronizes data with the primary memory.

It should be noted that, the foregoing description of the embodiment of the automatic switching system for a FEP is also applicable to the automatic switching method for a FEP in this embodiment. Details are not described herein again.

In the automatic switching method for a FEP provided according to the embodiments of this application works under a normal working condition, data acquisition and command delivery are performed by using the first primary driver and the second primary driver, and the first secondary driver and the second secondary driver are only used for data redundancy. Therefore, not only an amount of redundant data uploaded to the memory can be effectively reduced, to improve the communication reliability, but also the data integrity can be effectively ensured by using data redundancy when there is a fault. In addition, when there is a fault in the automatic switching system for a FEP, switching is performed promptly according to a fault type, thereby effectively ensuring the data integrity, and improving the intelligence, flexibility, and reliability of automatic switching of the FEP, which is simple and easy to implement.

In addition, the terms such as "first" and "second" are used only for the purpose of description, and should not be understood as indicating or implying the relative importance or implicitly specifying the quantity of the indicated technical features. Therefore, features defining "first" and "second" can explicitly or implicitly include at least one of the features. In description of this application, "a plurality of" means at least two, such as two and three unless it is specifically defined otherwise.

In this application, unless otherwise explicitly specified or defined, the first feature being located "above" or "below" the second feature may be the first feature being in a direct contact with the second feature, or the first feature being in an indirect contact with the second feature through an intermediary. In addition, that the first feature is "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is directly below or obliquely below the second feature, or may merely indicate that the horizontal position of the first feature is lower than that of the second feature.

In the description of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of this application have been shown and described above, it may be understood that, the foregoing embodiments are exemplary and should not be understood as limitation to this application. A person of ordinary skill in the art can make changes, modifications, replacements, or variations to the foregoing embodiments within the scope of this application.

What is claimed is:

1. An automatic switching system for a front end processor (FEP), comprising:
   at least one external device; and
   a FEP assembly, wherein the FEP assembly is connected to the at least one external device, the FEP assembly comprises a primary FEP and at least one secondary FEP, the primary FEP comprises a primary memory, a primary IO manager, and at least one primary driver, and the at least one secondary FEP comprises a secondary memory, a secondary IO manager, and at least one secondary driver, wherein
   the FEP assembly provides services upward by using the primary memory, the primary IO manager, the secondary memory, and the secondary IO manager, and is connected downward to the at least one external device by the at least one primary driver and the at least one secondary driver, and the FEP assembly is configured to use the at least one secondary driver as a new primary driver when there is a fault in a communication link between the at least one primary driver and the at least one external device, to transmit a control instruction to the at least one external device and acquire data from the at least one external device.

2. The system according to claim 1, wherein
   the primary memory is configured to store data transmitted by the at least one external device;
   the at least one primary driver is configured to transmit a control instruction to the at least one external device, to acquire data from the at least one external device; and
   the primary IO manager is configured to: control the at least one primary driver according to a communication management instruction, and receive status information of the at least one external device.

3. The system according to claim 1, wherein
   the secondary memory synchronizes data from the primary memory of the primary FEP;
   the secondary IO manager is configured to: control the at least one secondary driver according to a channel diagnosis instruction, and transmit the channel diagnosis instruction to the at least one external device by using at least one of the at least one primary driver and the at least one secondary driver, wherein the at least one external device generates a diagnosis packet according to the channel diagnosis instruction, and the secondary IO manager is further configured to: receive status information of the at least one external device, and synchronize data with the primary IO manager; and
   the at least one secondary driver is configured to receive the diagnosis packet transmitted by the at least one external device, to diagnose, according to the diagnosis packet, whether there is a fault in a communication link between the primary FEP and the at least one external device and a communication link between the secondary FEP and the at least one external device.

4. The system according to claim 3, wherein the primary IO manager is further configured to: receive device offline information of the at least one external device fed back by at least one of the at least one primary driver and the at least one secondary driver, and transmit a channel diagnosis instruction to the at least one external device by using at least one of the at least one primary driver and the at least one secondary driver.

5. The system according to claim 3, wherein when there is a fault in the communication link between the primary FEP and the at least one external device, the secondary memory communicates with the at least one secondary driver, to store data of the at least one external device, and synchronizes data with the primary memory, and when there is a fault in the communication link between the secondary FEP and the at least one external device, the primary memory communicates with the at least one primary driver, to store data of the at least one external device.

6. The system according to claim 5, wherein the at least one external device comprises a first external device and a second external device, when there is a fault in a communication link between the primary FEP and the first external device and there is a fault in a communication link between the secondary FEP and the second external device, the secondary memory communicates with the at least one secondary driver to store data of the first external device, the primary memory communicates with the at least one primary driver to store data of the second external device, and the secondary memory synchronizes data with the primary memory.

7. The system according to claim 3, wherein when there is a fault in a communication link between the primary FEP and the at least one secondary FEP, the primary FEP and the at least one secondary FEP simultaneously acquire data from the at least one external device and transmit a control instruction to the at least one external device.

8. The system according to claim 1, wherein the at least one primary driver comprises a first primary driver and a second primary driver, and the at least one secondary driver comprises a first secondary driver and a second secondary driver, wherein
when there is a fault in a communication link between the first primary driver and the at least one external device, the secondary memory communicates with the first secondary driver, to store data of the at least one external device, and synchronizes data with the primary memory, and when there is a fault in a communication link between the first secondary driver and the at least one external device, the primary memory communicates with the first primary driver, to store data of the at least one external device.

9. The system according to claim 8, wherein the at least one external device comprises a first external device and a second external device, when there is a fault in a communication link between the first primary driver and the first external device and there is a fault in a communication link between the second secondary driver and the second external device, the secondary memory communicates with the first secondary driver to store data of the first external device, and the primary memory communicates with the second primary driver to store data of the second external device, and the secondary memory synchronizes data with the primary memory.

10. A front end processor (FEP), comprising a primary FEP and a secondary FEP, wherein
the primary FEP comprises:
a primary memory, configured to store data transmitted by at least one external device;
at least one primary driver, configured to transmit a control instruction to the at least one external device, to acquire data from the at least one external device; and
a primary IO manager, configured to: control the at least one primary driver according to a communication management instruction, and receive status information of the at least one external device; and
the secondary FEP comprises:
a secondary memory, configured to synchronize data from the primary memory of the primary FEP;
at least one secondary driver, configured to receive a diagnosis packet transmitted by the at least one external device, to diagnose, according to the diagnosis packet, whether there is a fault in a communication link between the primary FEP and the at least one external device and a communication link between the secondary FEP and the at least one external device; and
a secondary IO manager, configured to: control the at least one secondary driver according to a channel diagnosis instruction, and transmit the channel diagnosis instruction to the at least one external device by using at least one of the at least one primary driver and the at least one secondary driver, wherein the at least one external device generates a diagnosis packet according to the channel diagnosis instruction, and the secondary IO manager is further configured to: receive status information of the at least one external device, and synchronize data with the primary IO manager.

11. An automatic switching method for a front end processor (FEP), performed by the system according to claim 1, wherein the method comprises the following steps:
providing services upward by using the primary memory, the primary IO manager, the secondary memory, and the secondary IO manager;
connecting downward to the at least one external device by the at least one primary driver and the at least one secondary driver; and
using the at least one secondary driver as a new primary driver when there is a fault in a communication link between the at least one primary driver and the at least one external device, to transmit a control instruction to the at least one external device and acquire data from the at least one external device.

12. The method according to claim 11, further comprising:
storing, by using the primary memory, data transmitted by the at least one external device;
transmitting a control instruction to the at least one external device by using the at least one primary driver, to acquire data from the at least one external device; and
controlling the at least one primary driver by using the primary TO manager according to a communication management instruction, and receiving status information of the at least one external device.

13. The method according to claim 11, further comprising:
synchronizing data from the primary memory of the primary FEP by using the secondary memory;

receiving, by using the at least one secondary driver, a diagnosis packet transmitted by the at least one external device, to diagnose, according to the diagnosis packet, whether there is a fault in a communication link between the primary FEP and the at least one external device and a communication link between the secondary FEP and the at least one external device; and controlling the at least one secondary driver by using the secondary TO manager according to a channel diagnosis instruction, transmitting the channel diagnosis instruction to the at least one external device by using at least one of the at least one primary driver and the at least one secondary driver, wherein the at least one external device generates a diagnosis packet according to the channel diagnosis instruction, and receiving, by using the secondary IO manager, status information of the at least one external device, and synchronizing data with the primary IO manager.

14. The method according to claim 11, further comprising:

receiving, by using the primary IO manager, device offline information of the at least one external device fed back by at least one of the at least one primary driver and the at least one secondary driver, and transmitting a channel diagnosis instruction to the at least one external device by using at least one of the at least one primary driver and the at least one secondary driver.

15. The method according to claim 13, further comprising:

communicating, by the secondary memory, with the at least one secondary driver when the primary FEP detects that there is a fault in the communication link between the primary FEP and the at least one external device, to store data of the at least one external device, wherein the secondary memory synchronizes data with the primary memory.

16. The method according to claim 13, further comprising:

communicating, by the primary memory, with the at least one primary driver when there is a fault in the communication link between the secondary FEP and the at least one external device, to store data of the at least one external device.

17. The method according to claim 16, wherein the at least one external device comprises a first external device and a second external device, and the method further comprises: when there is a fault in a communication link between the primary FEP and the first external device and there is a fault in a communication link between the secondary FEP and the second external device, communicating, by the secondary memory, with the at least one secondary driver to store data of the first external device, communicating, by the primary memory, with the at least one primary driver to store data of the second external device, wherein the secondary memory synchronizes data with the primary memory.

18. The method according to claim 13, further comprising:

simultaneously acquiring, by the primary FEP and the at least one secondary FEP, data from the at least one external device when there is a fault in a communication link between the primary FEP and the at least one secondary FEP, and transmitting a control instruction to the at least one external device.

19. The method according to claim 11, wherein the at least one primary driver comprises a first primary driver and a second primary driver, the at least one secondary driver comprises a first secondary driver and a second secondary driver, and the method further comprises:

communicating, by the secondary memory, with the first secondary driver when there is a fault in a communication link between the first primary driver and the at least one external device, to store data of the at least one external device, wherein the secondary memory synchronizes data with the primary memory, and communicating, by the primary memory, with the first primary driver when there is a fault in a communication link between the first secondary driver and the at least one external device, to store data of the at least one external device.

20. The method according to claim 19, wherein the at least one external device comprises a first external device and a second external device, and the method further comprises:

when there is a fault in a communication link between the first primary driver and the first external device and there is a fault in a communication link between the second secondary driver and the second external device, communicating, by the secondary memory, with the first secondary driver to store data of the first external device, and communicating, by the primary memory, with the second primary driver to store data of the second external device, wherein the secondary memory synchronizes data with the primary memory.

* * * * *